July 24, 1951  A. ANDERSON  2,561,770
MAGNETIC CHUCK
Filed June 29, 1948  2 Sheets-Sheet 1
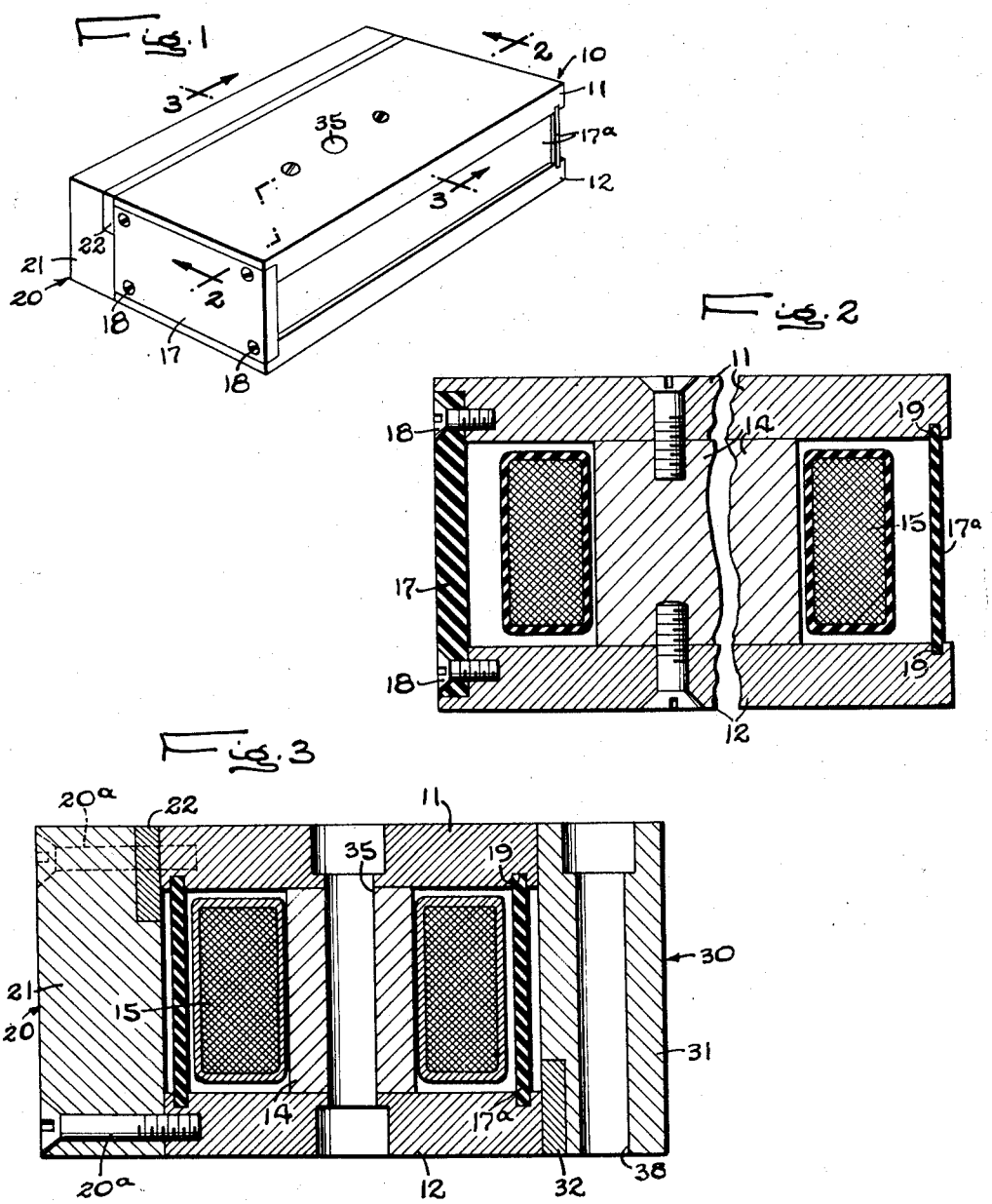
INVENTOR
Axel Anderson
By Carson, Pirie, Hubbard & Wolfe
ATTORNEY July 24, 1951  A. ANDERSON  2,561,770
MAGNETIC CHUCK Filed June 29, 1948  2 Sheets-Sheet 2

INVENTOR
Axel Anderson
By Carson, Pitzner Hubbard, Wolfe.
ATTORNEY

Patented July 24, 1951

2,561,770

UNITED STATES PATENT OFFICE 2,561,770

MAGNETIC CHUCK

Axel Anderson, Rockford, Ill., assignor to Sundstrand Magnetic Products Co., Rockford, Ill., a corporation of Illinois Application June 29, 1948, Serial No. 35,884

2 Claims. (Cl. 175—367)

The present invention relates to chucks for magnetically holding workpieces to permit machining thereof.

A general object of the invention is to provide a novel magnetic chuck which is highly versatile in its adaptability to hold workpieces of various sizes and shapes and which permits presentation of workpieces to a tool at any desired angle, which is of exceedingly simple construction, and which permits of economical manufacture.

A more specific object lies in the provision of a novel magnetic chuck which is operative both to magnetically chuck a workpiece and be magnetically attached to a work support and which permits magnetic chucking of a workpiece and mechanical attachment to the support, the novel chuck being constructed and arranged to include a high reluctance gap about which its magnetic flux circuit is established so as to eliminate the necessity for physically spacing elements thereof to establish the gap for each workpiece setup.

Still another object lies in the provision of a magnetic chuck, having a high reluctance gap included therein, which is fully effective throughout its full length to hold the workpieces.

The objects of the invention thus generally set forth together with other and ancillary advantages are attained by the construction and arrangement shown by way of illustration in the accompanying drawings, in which:

Figure 1 is a perspective view of a magnetic chuck embodying the instant invention.

Fig. 2 is a longitudinal section through the chuck taken substantially along the line 2—2 in Fig. 1.

Fig. 3 is a vertical transverse section taken substantially in the plane of line 3—3 in Fig. 1.

Figure 4:
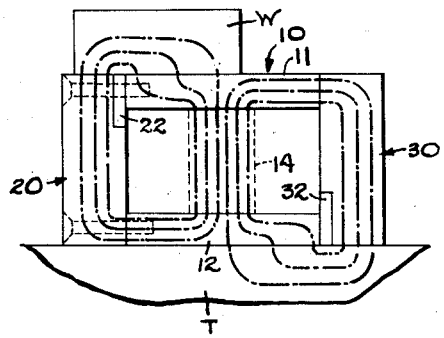
Fig. 4 is a diagrammatic view showing the chuck magnetically holding a workpiece and magnetically attached to a worktable.
Figure 5:
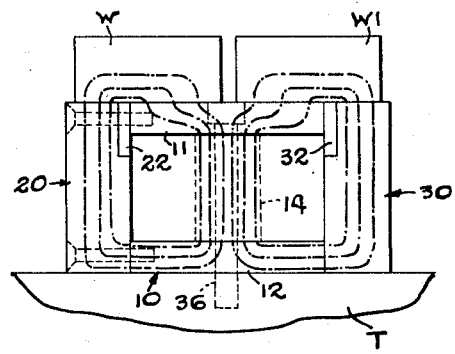
Fig. 5 is a diagrammatic view indicating a mechanical attachment of the chuck to the worktable and magnetic chucking of several workpieces.

Although a particular preferred embodiment of the invention has been shown and described in some detail there is no intention to thereby limit the invention to such embodiment, but on the other hand, the appended claims are intended to cover all modifications and alternative constructions within the spirit and scope of the invention as expressed in the appended claims.

As illustrated in the drawings the exemplary chuck comprises generally a magnetic core 10, and means operative in conjunction with the core 10 to insure inclusion of a workpiece or a work support in a magnetic flux circuit and thereby firmly hold the same. As shown, the magnetic core 10 includes a pair of rectangular plates 11 and 12 composed of magnetic material disposed in parallel relationship and rigidly secured to a rectangular central plate 14 which is also of magnetic material. About the central plate 14 is a simple winding 15 having connection with a source of electric current whereby the core 10 is energized. Upon energization of the winding 15 the upper and lower plates 11 and 12 become magnetic poles of opposite polarity.

To protect the sides and ends of the winding 15 from accidental mechanical damage, strips 17, 17a of a rigid non-magnetic material are provided. As shown, the strip 17 is held in place between the plates 11 and 12 by ordinary flat head screws 18, and the strips 17a by reception in slots 19 formed in the plates.

Figure 9:
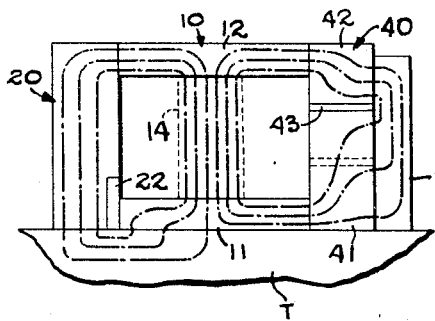
Fig. 9 is a diagrammatic view illustrating the modified loose parallel in use.

The means operative in conjunction with the core 10 to insure inclusion of a workpiece or support in a flux circuit established upon energization of the winding 15, comprises a member 20 known as a parallel which is of a length and height equal to those of the core 10. As shown, the parallel 20 is disposed along one side of the core 10 and is secured to the core plates 11 and 12 as by screws 20a of non-magnetic material. The parallel 20 includes a body 21 of magnetic material rabbeted along the full length of its edge adjacent the core plate 11 to receive an elongated rectangular insert 22. The latter comprises a strip of non-magnetic material of a length equal to that of the core 10 and of a height greater than the thickness of the plate 11. The insert 22 thus constitutes a high reluctance gap between the two magnetic poles of the chuck, viz. the core plate 11 and the parallel body 21, when the winding 15 is energized. A magnetic flux circuit which includes a workpiece or a work support is thus assured. To spell it out the flux circuit established about the insert 22 includes the three plates 11, 14 and 12 of the core 10, the parallel body 21 and a workpiece W (Fig. 4) or a worktable T (Fig. 9).

In addition to the fixed parallel 20, there is provided separate or loose parallel 30 which is constructed in the same manner as the fixed parallel 20, including a body 31 of magnetic material and an insert 32 of non-magnetic material secured along one of its edges throughout the full length thereof. When it is desired to magnetically attach the chuck to a work support, for example, the work table T, the loose parallel 30 is placed adjacent the side of the core 10 opposite the fixed parallel 20 and in inverted relation thereto thus positioning the insert 32 adjacent the lower core plate 12. When the winding 15 is energized a magnetic flux circuit is established about the insert 32 and includes the core 10, the body 31 of the loose parallel 30 and the table T in the same manner and simultaneously with the flux circuit established about the insert 22 of the fixed parallel 20 to hold the workpiece W.

To hold additional workpieces on the upper face of the chuck, the loose parallel 30 is placed against the magnetic core 10 in a position corresponding to that of the fixed parallel 20 with the insert 32 adjacent the core plate 11 and the body 31 in contact with the core plate 12. Thus provision for two magnetic circuits is made, one for holding the workpiece W and another for holding a workpiece W1. While there will be some magnetic attachment of the chuck to the worktable T, to insure maintenance of the chuck in a fixed position on the worktable T in this set up, the core 10 is constructed to permit of mechanical attachment to the table. To this end, it is provided with a centrally disposed hole 35 for the reception of a bolt 36. The end portions of the holes 35 are enlarged so that the bolt head will be completely recessed within the core 10.

Figure 6:
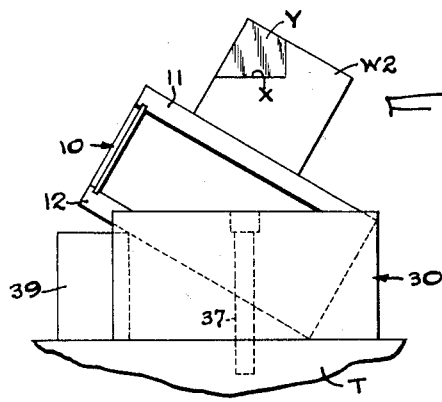
Figs. 6 and 7 are side elevational and plan views respectively of the chuck and workpiece set up in compound angular relationship for presentation of particular workpiece surfaces for machining.
Figure 7:
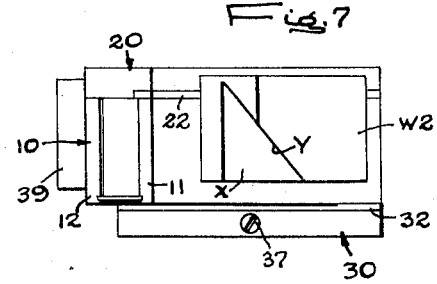

The improved chuck may be used for holding variously shaped workpieces for machining. In Figures 6 and 7 there is illustrated a setup to obtain a compound angular relationship in order to properly present two surfaces X and Y of a workpiece W2 for machining. This entails the necessity for both transverse and longitudinal alinement. To this end the loose parallel 30 is attached mechanically to the worktable T by means of a bolt 37 received in a hole 38 extending through the parallel 30. The magnetic core 10 is placed against the parallel 30 and is tilted to the proper angle with respect to the worktable T so that longitudinal alinement is attained. After this adjustment is made, a suitable support 39 may be used to maintain the angle when the winding 15 is de-energized. To attain transverse alinement, the whole chuck, including both the core 10 with the fixed parallel 20 thereon and the loose parallel 30 is rotated about the bolt 37 as an axis.

Figure 8:
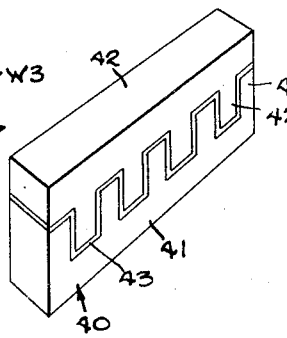
Fig. 8 is a perspective view of a modified form of loose parallel.

In order to present a series of magnetic poles whereby a series of flux circuits can be set up, a modified form of loose parallel 40 is provided. The parallel 40, as shown in Fig. 8, includes two complementarily formed body sections 41 and 42, of magnetic material having interengaging portions 41a and 42a, respectively. These portions are separated by a conformingly shaped insert 43 of non-magnetic material to form a high reluctance gap between adjacent points of the two body sections 41 and 42 about which magnetic flux circuits, including a workpiece placed over the insert and anywhere along it, are established when the winding 15 is energized. This form of parallel is particularly useful in chucking small workpieces and in chucking workpieces of small cross section.

In use, as shown in Fig. 9, the chuck is magnetically attached to the worktable T by inverting the same from the position illustrated in Fig. 4 to place the insert 22 of the fixed parallel 20 adjacent the table so that a flux circuit established about the insert when the winding 15 is energized includes the table T. The modified loose parallel 40 is disposed adjacent the opposite side of the magnetic core 10 with the body section 41 against the core plate 11 and the body section 42 against the core plate 12, and a workpiece W3 is placed to extend across some portion of the insert 43. The magnetic flux circuit established about the insert 43 when the winding 15 is energized thus includes the core 10, body section 41, the workpiece W3, the body section 42 and back to the core.

From the foregoing, therefore, it can be seen that a magnetic chuck constructed in accordance with the present invention has an included high reluctance gap thereby eliminating the necessity for individual spacing of the chuck elements to establish a gap. The gap formed by the insert 22 between the fixed parallel body 21 and the core 10 and also the gaps formed between the core and the body sections of magnetic material of the loose parallel extend the full length of the chuck. This construction makes the chuck fully effective throughout its whole length to hold one or several workpieces placed anywhere upon it, so long as that work is of magnetic material and extends across or bridges the gap. An additional advantage flowing from this construction is that for long work including a single piece or many small pieces placed side by side several chucks can be used in end to end relation and the work is firmly held throughout its length. It is readily apparent that the instant chuck is exceedingly versatile to hold workpieces of various sizes and shapes and at various angles for machining. An especially important feature of the instant chuck is its exceedingly simple construction. The magnetic core comprises three plates each of which is of simple rectangular shape and a simple core winding. The elements of the parallels are of equally simple form including both the magnetic and non-magnetic portions. Thus only simple machining and assembly operations are required to produce the chuck thereby permitting of economical manufacture.

I claim as my invention:

1. A magnetic chuck comprising, in combination, a magnetic core including upper and lower plates disposed in parallel relation, a central plate rigidly secured to and between the upper and lower plates and a winding disposed about said central plate, each of said plates being of magnetic material and the upper and lower plates becoming magnetic poles of opposite polarity upon energization of said winding, and two parallels each of which is of a length and height equal to the length and height of said core and includes a body of magnetic material and an insert of non-magnetic material of a height greater than the thickness of said upper and lower plates and extending along one longitudinal edge of said body throughout its full length, one of said parallels being disposed with its body fixed in contact with said lower plate and the insert thereof disposed between its body and said upper plate, the other of said parallels being alternately positionable in similar or opposite relation to said fixed parallel and on the opposite side of said core, said fixed parallel and said core defining magnetic poles of opposite polarity separated by a high reluctance gap in one face and along one side of the chuck and said loose parallel and said core defining magnetic poles of opposite polarity along the other side of said chuck alternatively in the other chuck face to permit magnetic chucking of a work-piece and magnetic attachment to a work support or in the said one chuck face to permit magnetic chucking of additional workpieces thereon.

2. A magnetic chuck comprising, in combination, a magnetic core including upper and lower plates disposed in parallel relation, a central plate rigidly secured to and between the upper and lower plates and a winding disposed about said central plate, each of said plates being of magnetic material and the upper and lower plates becoming magnetic poles of opposite polarity upon energization of said winding, a first parallel which is of a length and height equal to the length and height of said core and includes a body of magnetic material and an insert of non-magnetic material of a height greater than the thickness of said upper plate and extending along one longitudinal edge of said core throughout its length with its body fixed in contact with said lower plate and the insert thereof disposed between its body and said upper plate, and a second parallel similar to said first parallel having its body fixed in contact with said upper plate and said insert disposed between its body and said lower plate, said first parallel and upper plate defining magnetic poles of opposite polarity separated by a high reluctance gap on the upper face of the chuck to permit chucking of a workpiece and said core and second parallel defining magnetic poles of opposite polarity separated by a high reluctance gap on the bottom face of said chuck to permit magnetic attachment to a work support.

AXEL ANDERSON.

REFERENCES CITED

The following references are of record in the file of this patent:

UNITED STATES PATENTS

| Number | Name | Date |
|---|---|---|
| 564,296 | Walker | July 21, 1896 |
| 651,908 | Walker | June 19, 1900 |
| 843,312 | Vance | Feb. 5, 1907 |
| 1,222,052 | Walker | Apr. 10, 1917 |
| 1,673,719 | Tracy | June 12, 1928 |
| 2,347,170 | Brown | Apr. 25, 1944 |

FOREIGN PATENTS

| Number | Country | Date |
|---|---|---|
| 291,598 | Germany | Mar. 5, 1914 |
| 308,914 | Germany | Jan. 3, 1917 |